S. M. MILLER.
CEREAL SPROUTING OVEN.
APPLICATION FILED APR. 12, 1916.
1,300,992.
Patented Apr. 15, 1919.
2 SHEETS—SHEET 1.
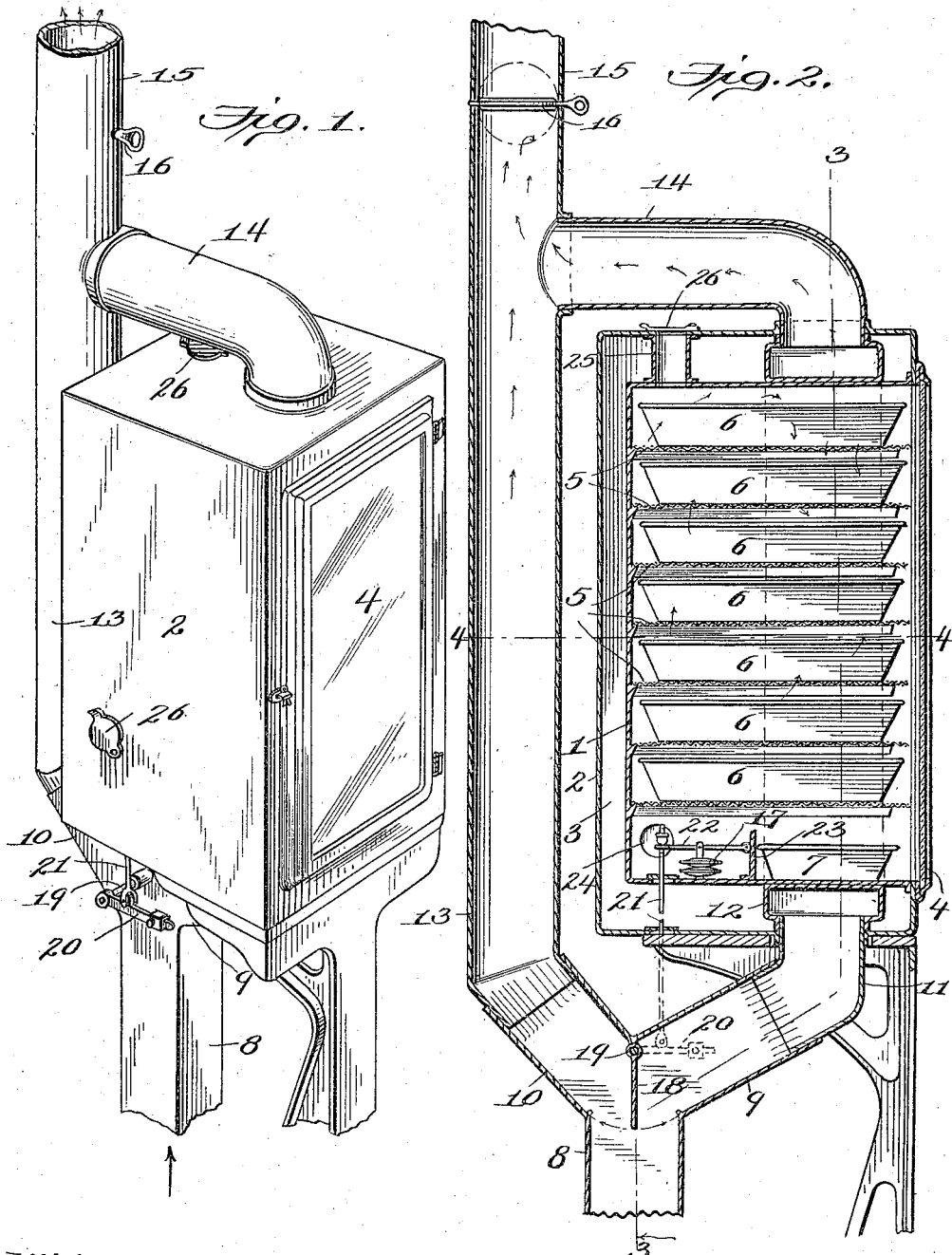
Witnesses:
C. D. Kesler
John Powers
Inventor
Simon M. Miller
by James L. Norris,
Attorney

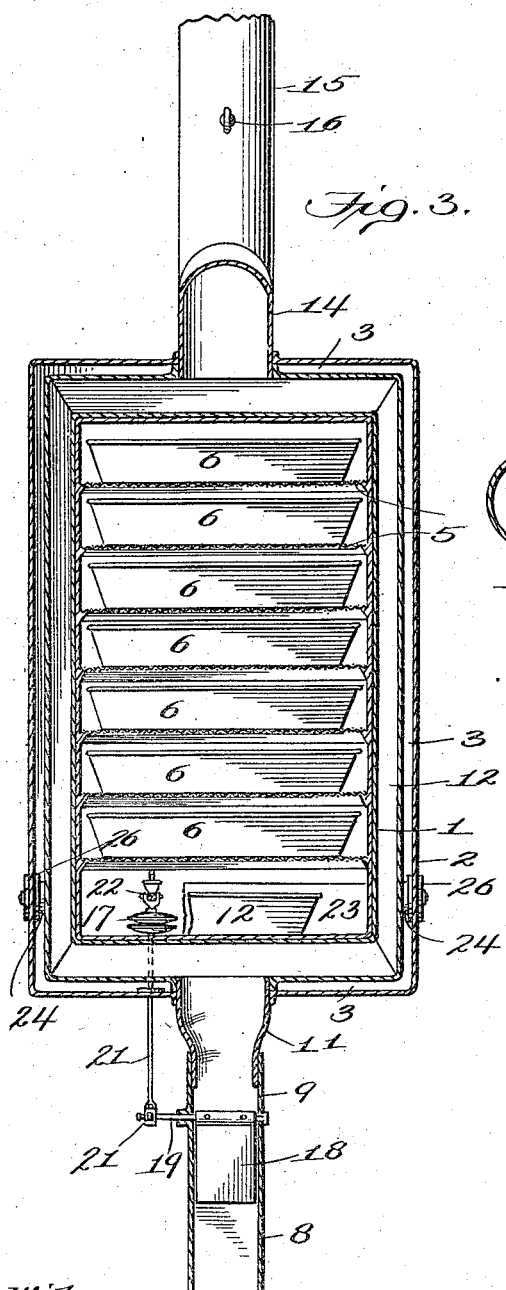
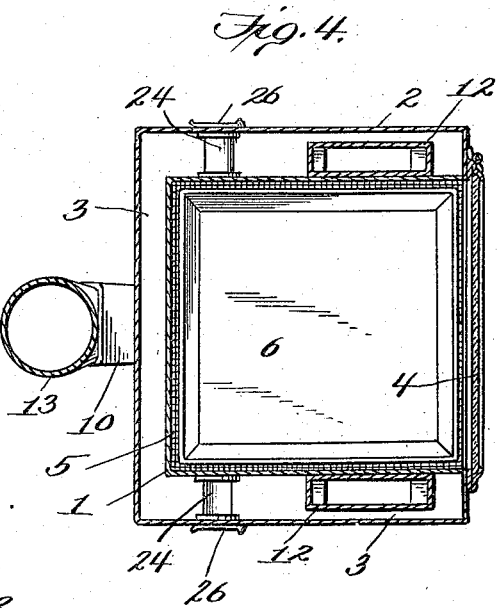

UNITED STATES PATENT OFFICE.

SIMON M. MILLER, OF BRIDGEWATER, VIRGINIA.

CEREAL-SPROUTING OVEN.

1,300,992.   Specification of Letters Patent.   Patented Apr. 15, 1919.

Application filed April 12, 1916. Serial No. 90,719.

*To all whom it may concern:*

Be it known that I, SIMON M. MILLER, a citizen of the United States, residing at Bridgewater, in the county of Rockingham and State of Virginia, have invented new and useful Improvements in Cereal-Sprouting Ovens, of which the following is a specification.

This invention relates to an improved cereal sprouting oven and its principal objects are to provide such an oven in a form which enables its use as an adjunct of a brooder to utilize the waste heat thereof and to provide for the continuous and accurate regulation of the oven heat without affecting the brooder heat.

The invention consists in certain novel features of structure, combination and relation which, together with the above and other advantages, will appear as the description proceeds.

An embodiment of the invention is illustrated in the accompanying drawings, wherein:—

Figure 1 is a perspective view of the improved oven;

Fig. 2 is a vertical central sectional view;

Fig. 3 is a vertical cross-sectional view on the line 3—3 of Fig. 2; and

Fig. 4 is a horizontal sectional view on the line 4—4 of Fig. 2.

Similar characters of reference designate corresponding parts throughout the several views.

The oven proper consists of an inner shell 1 which is preferably arranged within an outer shell 2 which provides a dead-air insulating space 3. The shell 1 is normally closed by a hinged, preferably transparent, door 4 and is provided with foraminous shelves 5 or equivalent devices for supporting the pans 6 which contain the cereals to be sprouted. The sprouting of the cereals with the apparatus disclosed will require about a week. Each of the pans 6 will contain sufficient cereal to provide a day's feeding for the number of fowls within the capacity of the brooder. It follows that there should be seven pans 6 within the shell 1 and that as a pan containing sprouted cereal is removed another pan containing dry cereal should be substituted, care being taken that each pan is allowed to remain in the oven for a week to insure the sprouting of the cereal therein.

The sprouting of the cereal is promoted by humidifying the air within the shell 1, and for this purpose, a pan 7 containing water is supported on the base of the shell 1, the water from this pan being continuously given off in vaporous form to the air within the shell 1. The medium by which the interior of the shell 1 is heated is conducted by a pipe 8 whose upper end is of forked construction and is provided with branches 9 and 10. The pipe 8 may receive heated air from any suitable source but it is preferably connected to the waste heat outlet of a brooder, the oven, as above suggested, being intended primarily as an adjunct of a brooder. The branch 9 is connected by a coupling pipe 11 to an oven heating pipe, preferably in the form of a hollow rectangular frame 12 arranged in the dead-air space 3 and within which the shell 1 is set, the frame 12 completely circumscribing the shell 1 and fitting immediately against the bottom, top and side walls of said shell. The branch 10 is joined to a by-pass pipe 13 and the upper bar of the frame 12 is connected to an outlet pipe 14 extending through the top of the shell 2 and leading to said by-pass pipe, which, beyond the pipe 14, has a continuation 15 provided with a damper, or the like, 16. The heat within the shell 1 depends, other things being equal, on the heat within the frame 12. Said frame is preferably arranged in the same transverse plane as the pan 7 with its lower cross bar directly under said pan whereby to efficiently heat the water which the pan contains.

Obviously, by diminishing or increasing the column of the heating medium passing through the frame 12, the heat of the shell 1 will be lowered or raised. These characteristics are utilized in the automatic regulation of the heat of the shell 1, the means employed consisting of a thermostat 17 supported on the base of said shell and of any suitable construction, and a valve or regulating plate 18 common to the branches 9 and 10 and having its position controlled by the thermostat 17. The valve 18 is mounted on and pendant from a rock shaft 19 arranged centrally of the branches 9 and 10 at the upper side thereof and having a projecting end provided with an arm 20 which is preferably weighted and is connected by a link 21 to a lever 22. The lever 22 is connected between its ends to the thermostat 17 and at its inner end is pivoted to a bracket 23.

The drawings show the valve 18 symmetrically related to the branches 9 and 10 and in what may, therefore, be termed a normal or neutral position. The heat in the shell 1 should be kept substantially constant and for this purpose, the valve 18 is moved toward the inlet end of either of the pipes 9 or 10. Thus, if the heat within the shell 1 falls below the normal determined degree, the thermostat 17 will move the valve 18 toward the branch 10, thereby increasing the effective inlet area of the branch 9 and admitting a greater volume of heating medium to the branch 9 and frame 12 with the result that the heat in the shell 1 will be raised to the normal degree, at which time the valve 18 will be restored by the thermostat to its neutral position. On the other hand, if the heat in the shell 1 rises above the normal degree, the thermostat 17 will move the valve 18 toward the branch 9, thereby reducing the volume of heating medium which passes into the branch 9 and frame 12 and increasing the volume of heating medium which is diverted by the branch 10 and by-pass pipe 13. When, owing to the reduction in the volume of the heating medium passing through the branch 9 and frame 12, the heat in the shell 1 has fallen to the normal degree, the thermostat 17 will restore the valve 18 to its normal position. In this way, the thermostat 17 and valve 18 provide for a continuous regulation of the heat in the shell 1 and insure that the degree of heat shall be substantially constant.

It will be apparent that the automatic regulation of the degree of heat in the shell 1 is entirely independent of the regulation of the heat of the brooder.

To provide for its effective ventilation the inner shell 1 has at its sides open-ended air inlet tubes 24 and at its top an open-ended air outlet tube 25 of somewhat greater diameter than the tubes 24. The tubes 24 and 25 project through the dead-air space 3 and through the outer shell 2 on which are mounted, pivotally or otherwise, regulating plates 26 operable to cover or disclose to any desired extent, the outer ends of said tubes.

The shell 1 may be supported in any suitable manner within the shell 2. As shown, the shell 1 is suitably connected to the front wall of the shell 2 and is also supported by the frame 12 which, in turn, is supported by the shell 2. The bottom and sides of the shell 2 are preferably spaced from the bottom and sides of the frame 12, as shown in Fig. 3, to provide for the complete exposure of the frame 12 to the dead-air within the chamber 3.

It will be understood that no specific description herein contained is intended to put any limitation upon the appended claims which does not inhere in the language thereof.

I claim—

1. In combination, an upright oven comprising inner and outer shells having a dead-air space between them, an upright heating pipe in the form of a frame disposed transversely of the oven within the dead-air space, said pipe completely circumscribing the inner shell and having its inner walls immediately adjoining said inner shell and its remaining wall spaced from said outer shell, an upright by-pass pipe disposed exteriorly of the oven, a heat supply pipe below said oven, branches leading to the lower ends of said by-pass pipe and said circumscribing pipe from said supply pipe, means for regulating the passage of the heat through said branches, and a branch leading from the top of said circumscribing pipe to the upper portion of said by-pass pipe.

2. In a cereal sprouting oven, the combination of a hollow frame serving as a conductor for a heating medium, an inner shell set within and heated by said frame, an outer shell inclosing, and spaced from, said inner shell and said frame, said outer shell providing a dead air space, a heat supply pipe arranged externally of said outer shell and connected to said frame, a by-pass pipe arranged externally of said outer shell and connected to said supply pipe, a branch pipe leading from said frame and connected to said by-pass pipe, and valve means for controlling the passage of the heating medium from said supply pipe through either said frame or said by-pass pipe.

In testimony whereof I have hereunto set my hand in presence of two subscribing witnesses.

SIMON M. MILLER.

Witnesses:
 JNO. W. DOVEL,
 JAS. R. SHIPMAN.

Copies of this patent may be obtained for five cents each, by addressing the "Commissioner of Patents, Washington, D. C."